(12) United States Patent
Sakamoto et al.

(10) Patent No.: US 11,827,060 B2
(45) Date of Patent: Nov. 28, 2023

(54) HEAVY LOAD TIRE

(71) Applicant: BRIDGESTONE CORPORATION, Tokyo (JP)

(72) Inventors: Masakazu Sakamoto, Tokyo (JP); Tomoo Hasegawa, Tokyo (JP); Hiroaki Ebata, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 483 days.

(21) Appl. No.: 17/254,084

(22) PCT Filed: Apr. 24, 2019

(86) PCT No.: PCT/JP2019/017396
§ 371 (c)(1),
(2) Date: Dec. 18, 2020

(87) PCT Pub. No.: WO2019/244476
PCT Pub. Date: Dec. 26, 2019

(65) Prior Publication Data
US 2021/0260928 A1  Aug. 26, 2021

(30) Foreign Application Priority Data
Jun. 19, 2018 (JP) ................................ 2018-115869

(51) Int. Cl.
*B60C 11/13* (2006.01)
*B60C 11/11* (2006.01)
*B60C 11/03* (2006.01)

(52) U.S. Cl.
CPC ... *B60C 11/1392* (2013.01); *B60C 2011/0344* (2013.01); *B60C 2011/0348* (2013.01);
(Continued)

(58) Field of Classification Search
CPC ... B60C 11/11; B60C 11/1384; B60C 11/1392
See application file for complete search history.

(56) References Cited

U.S. PATENT DOCUMENTS

2012/0241061 A1   9/2012 Maehara
2012/0267021 A1* 10/2012 Guichon ............ B60C 11/1392
                                            152/209.24
(Continued)

FOREIGN PATENT DOCUMENTS

CN   104210317 A   12/2014
EP   2 974 887 A1   1/2016
(Continued)

OTHER PUBLICATIONS

Machine Translation: JP-2006218946-A, Gomyo T, (Year: 2023).*
(Continued)

*Primary Examiner* — Kendra Ly
(74) *Attorney, Agent, or Firm* — Oliff PLC

(57) ABSTRACT

A heavy load tire includes: a plurality of circumferential grooves extending along a tire circumferential direction; a plurality of lateral grooves extending along a tire width direction and formed in a direction crossing the circumferential grooves; and a plurality of blocks partitioned by the circumferential grooves and the lateral grooves. On a whole surface of one end portion in the tire circumferential direction of a center block formed in a center area among the plurality of blocks, an inclined portion inclined inward in a tire radial direction toward the end portion is formed.

3 Claims, 5 Drawing Sheets

(52) U.S. Cl.
CPC ............... *B60C 2011/0358* (2013.01); *B60C 2011/0365* (2013.01); *B60C 2011/133* (2013.01); *B60C 2200/06* (2013.01); *B60C 2200/065* (2013.01)

(56) References Cited

U.S. PATENT DOCUMENTS

| | | | |
|---|---|---|---|
| 2014/0000776 A1 | 1/2014 | Nakamura | |
| 2014/0130949 A1* | 5/2014 | Maehara | B60C 11/0306 |
| | | | 152/209.8 |
| 2016/0023518 A1* | 1/2016 | Kawakami | B60C 11/1307 |
| | | | 152/209.23 |
| 2016/0272010 A1 | 9/2016 | Washizuka et al. | |
| 2019/0100057 A1* | 4/2019 | Barbarin | B60C 11/125 |
| 2019/0105949 A1* | 4/2019 | Mansuy | B60C 11/0302 |
| 2019/0126687 A1 | 5/2019 | Asano | |
| 2019/0375248 A1* | 12/2019 | Takagi | B60C 11/1392 |

FOREIGN PATENT DOCUMENTS

| | | | | |
|---|---|---|---|---|
| JP | 2006-218946 A | | 8/2006 | |
| JP | 2006218946 A | * | 8/2006 | ......... B60C 11/1384 |
| JP | 2007-230399 A | | 9/2007 | |
| JP | 2008-049730 A | | 3/2008 | |
| JP | 2010-234895 A | | 10/2010 | |
| JP | 2010234895 A | * | 10/2010 | |
| JP | 2012-171591 A | | 9/2012 | |
| JP | 2012-201253 A | | 10/2012 | |
| JP | 2014-008904 A | | 1/2014 | |
| JP | 2017-081286 A | | 5/2017 | |
| WO | 2014/141715 A1 | | 9/2014 | |
| WO | 2015/068520 A1 | | 5/2015 | |
| WO | 2018/043545 A1 | | 3/2018 | |

OTHER PUBLICATIONS

Machine Translation: JP-2010234895-A, Yamakawa T, (Year: 2023).*
Jul. 9, 2019 International Search Report issued in International Patent Application No. PCT/JP2019/017396.
Feb. 9, 2022 Extended Search Report issued in European Patent Application No. 19823628.3.
Mar. 13, 2022 Search Report issued in Chinese Patent Application No. 201980039965.2.

* cited by examiner

HEAVY LOAD TIRE

TECHNICAL FIELD

The present invention relates to heavy load tires.

BACKGROUND ART

A groove width of a lateral groove provided in a heavy load tire may be large (Patent Document 1). When the groove width of the lateral groove is large as in a case of the heavy load tire according to Patent Document 1, air easily flow into the lateral groove during traveling, and a tread portion is cooled by the air. Therefore, a heat storage in the tread portion is small.

CITATION LIST

Patent Literature

[Patent Document 1] Japanese Patent Application Publication No. 2014-8904

SUMMARY OF INVENTION

Technical Problem

However, when the groove width of the lateral groove is large as in the case of the heavy load tire according to Patent Document 1, a wear performance is disadvantageous. On the other hand, simply reducing the groove width of the lateral groove improves the wear performance, but increases the heat storage in the tread portion.

In view of the foregoing problem, the present invention provides a heavy load tire capable of efficiently cooling a tread portion even when a groove width of a lateral groove is small.

Solution to Problem

A heavy load tire comprises a plurality of circumferential grooves extending along a tire circumferential direction; a plurality of lateral grooves extending along a tire width direction and formed in a direction crossing the circumferential grooves; and a plurality of blocks partitioned by the circumferential grooves and the lateral grooves. On a whole surface of one end portion in the tire circumferential direction of a center block formed in a center area among the plurality of blocks, an inclined portion inclined inward in a tire radial direction toward the end portion is formed.

Advantageous Effects of Invention

According to the present invention, the tread portion can be efficiently cooled.

DESCRIPTION OF EMBODIMENTS

Hereinafter, an embodiment of the present invention will be described with reference to the drawings. In the illustration of the drawings, the same constituents are denoted by the same reference signs, and description thereof is omitted.

(Heavy Load Tire Configuration)

The configuration of a heavy load tire 100 will be described with reference to FIG. 1. The heavy load tire 100 according to the present embodiment is applied to a heavy load vehicle such as a construction vehicle.

Figure 1:
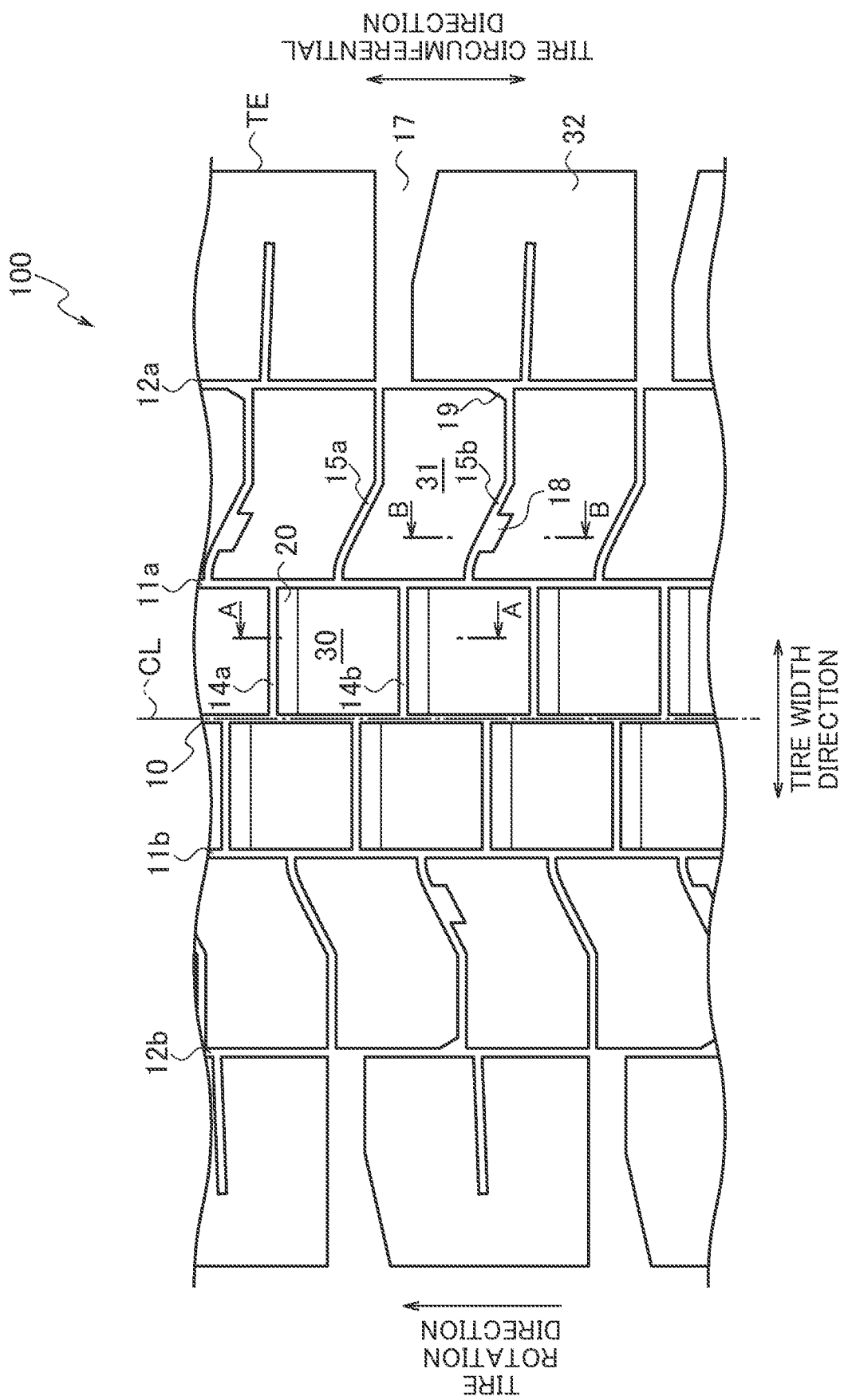
FIG. 1 is a plan view showing a tread surface of a heavy load tire according to an embodiment of the present invention.

As shown in FIG. 1, on a tread portion of the heavy load tire 100, a circumferential groove 10 (first circumferential groove) extending along a tire circumferential direction is formed. The circumferential groove 10 is formed on a tire equator line CL.

A circumferential groove 11a (second circumferential groove) is formed on right side of the circumferential groove 10 so as to be adjacent to the circumferential groove 10 along the tire width direction. Similarly, a circumferential groove 11b (second circumferential groove) is formed on left side of the circumferential groove 10 so as to be adjacent to the circumferential groove 10 along the tire width direction.

Further, a plurality of lateral grooves (the lateral grooves 14a and 14b) communicates with the circumferential groove 10 and the circumferential groove 11a are formed. The lateral grooves 14a (third lateral groove) and the lateral grooves 14b are formed so as to be adjacent to each other along the tire circumferential direction. The lateral grooves 14a and 14b are formed along the tire width direction. The groove width of the lateral groove 14a and the groove width of the lateral groove 14b is 3 mm to 30 mm.

A plurality of center blocks 30 are partitioned by the circumferential groove 10, the circumferential groove 11a, the lateral groove 14a, and the lateral groove 14b. The center blocks 30 are formed in a center area of the heavy load tire 100. In this embodiment, the center area is defined as an area in the vicinity of the center in the tire width direction from the circumferential groove 10 to the circumferential groove 11a (the circumferential groove 11b).

In a shoulder area of the heavy load tire 100, a circumferential groove 12a (third circumferential groove), a shoulder block 32, and a shoulder groove 17 are formed. The shoulder groove 17 opens at a tread surface end TE and communicates with the circumferential groove 12a and the lateral groove 15a. The circumferential groove 12a is formed on the right side of the circumferential groove 11a so as to be adjacent to the circumferential groove 11a along the tire width direction. In this embodiment, the shoulder area is defined as an area located outside the center area in the tire width direction. The tread surface end TE is an outermost position in the tire width direction of a tire surface (tread surface) in contact with the ground. The circumferential groove 12a (the circumferential groove 12b) is formed outside the circumferential groove 11a (the circumferential groove 11b) in the tire width direction.

In the shoulder area, a plurality of lateral grooves communicate with the circumferential grooves 11a and the circumferential grooves 12a (the lateral grooves 15a and 15b) are formed. The lateral grooves 15a (first lateral groove) and the lateral grooves 15b (second lateral groove) are formed along the tire width direction. The lateral groove 15a and the lateral groove 15b have one bending point. The lateral groove 15a and the lateral groove 15b are inclined in the tire width direction from outside in the tire width direction toward the tire equator line CL with the bending point as a boundary.

A plurality of intermediate blocks 31 are partitioned by the circumferential groove 11a, the circumferential groove 12a, the lateral groove 15a, and the lateral groove 15b. In other words, the intermediate blocks 31 are formed between the center blocks 30 and the shoulder blocks 32. The groove width of the lateral groove 15a and the groove width of the lateral groove 15b is 3 mm to 30 mm.

As shown in FIG. 1, one end of the lateral groove 15a and the lateral groove 15b communicates with the circumferential groove 11a, but does not communicate with the lateral groove 14a or the lateral groove 14b. A position where one end of the lateral groove 15a and the lateral groove 15b communicates with the circumferential groove 11a is the center of the center blocks 30 in the tire circumferential direction. However, is not limited to this case. As long as the position where one end of the lateral groove 15a and the lateral groove 15b communicates with the circumferential groove 11a is near the center of the center blocks 30 in the tire circumferential direction, a slight deviation is allowed. The pitches of the center blocks 30 and the intermediate blocks 31 are deviated in the tire circumferential direction.

One end of the lateral groove 15a communicates with the circumferential groove 11a, and the other end of the lateral groove 15a communicates with the circumferential groove 12a and the shoulder groove 17. On the other hand, one end of the lateral groove 15b communicates with the circumferential groove 11a, and the other end of the lateral groove 15b communicates with the circumferential groove 12a. However, the other end of the lateral groove 15b does not communicate with the shoulder groove 17. That is, in the plurality of lateral grooves (the lateral grooves 15a and 15b) communicating with the circumferential groove 11a and the circumferential groove 12a, there are lateral grooves communicating with the shoulder groove 17 (the lateral groove 15a) and lateral grooves not communicating with the shoulder groove 17 (the lateral groove 15b).

Figure 3:
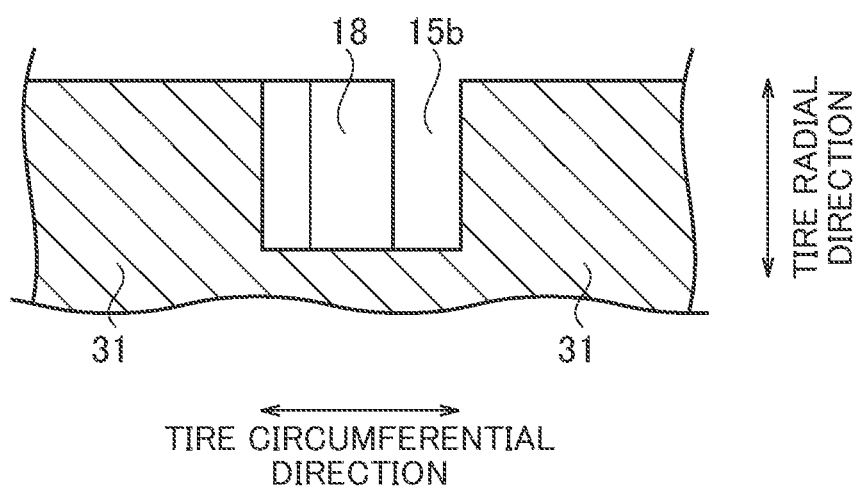
FIG. 3 is a cross-sectional view along line B-B of FIG. 1.

At a part of a stepping end of the intermediate block 31, a groove 18 is formed. At a part of the kick-out end of the intermediate block 31, a notch 19 is formed. The stepping end of the intermediate block 31 is a portion that contacts the ground first when the heavy load tire 100 rotates. As shown in FIG. 3, on the wall surface of the stepping end of the intermediate block 31, the groove 18 is formed toward the tire radial direction. The groove 18 and the notch 19 will be described later.

Figure 2:
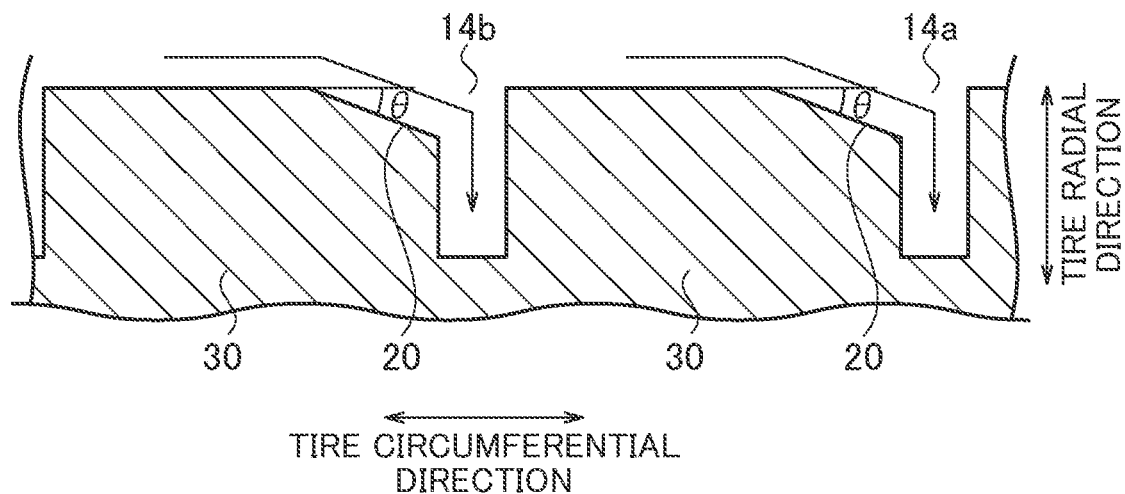
FIG. 2 is a cross-sectional view along line A-A of FIG. 1.

On a whole surface of the stepping end of the center blocks 30 in the tire width direction, an inclined portion 20 inclined inward in the tire radial direction toward the end portion is formed. In other words, on the whole surface of one end in the tire circumferential direction of the center block 30, the inclined portion 20 inclined along the tire circumferential direction is formed. The inclined portion 20 will be described with reference to FIG. 2. As shown in FIG. 2, the inclination angle θ of the inclined portion 20 is 20 degrees or less with respect to the tire circumferential direction. By forming the inclined portion 20, as shown by an arrow in FIG. 2, when the heavy load tire 100 rotates, air easily flows into the lateral groove 14a and the lateral groove 14b. By this air flow, heat radiation of the tread portion is promoted and the tread portion is cooled.

Next, with reference to FIG. 4, the groove 18 formed in the intermediate block 31 and the notch 19 will be described.

Figure 4:
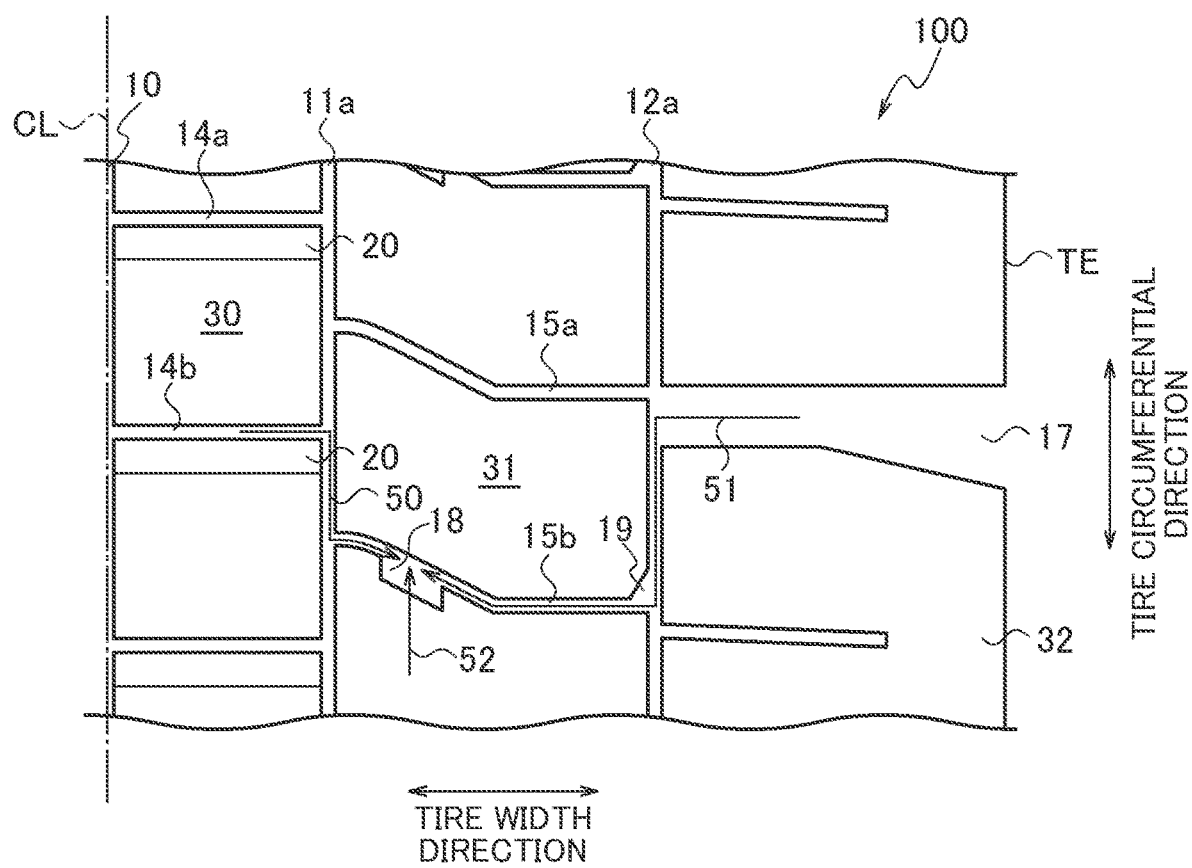
FIG. 4 is a plan view showing the tread surface of the heavy load tire according to an embodiment of the present invention.

As shown in FIG. 4, the groove 18 is formed at a position closer to the tire equator line CL than the tread surface end TE on the wall surface of the stepping end of the intermediate block 31. In other words, on the wall surface of the stepping end of the intermediate block 31, the groove 18 is formed inside in the tire width direction toward the tire radial direction and is opened to the lateral groove 15a. The shape of the groove 18 is not limited to a quadrangular shape, and various shapes can be applied.

The notch 19 is formed at a position closer to the tread surface end TE than the tire equator line CL at the kick-out end of the intermediate block 31. In other words, the notch 19 is formed at an outer end in the tire width direction at the kick end of the intermediate blocks 31. Moreover, in other words, the notch 19 is formed at a position where the lateral groove 15b and the circumferential groove 12a cross.

Also, both the groove 18 and the notch 19 are not formed in one intermediate block 31. Either the groove 18 or the notch 19 is formed in one intermediate block 31. In this embodiment, the intermediate block 31 where the groove 18 is formed and the intermediate block 31 where the notch 19 is formed are alternately formed along the tire circumferential direction. However, is not limited to this case. Both the groove 18 and the notch 19 can be formed in one intermediate block 31.

Next, the effect of the groove 18 and the notch 19 will be described. As shown in FIG. 4, since the lateral groove 15a communicates with the shoulder groove 17, the air flowing from the shoulder groove 17 easily flows into the lateral groove 15a. On the other hand, since the lateral groove 15b does not communicate with the shoulder groove 17, the air flowing from the shoulder groove 17 hardly flows into the lateral groove 15b. Since the air flowing from the shoulder groove 17 hits the side wall of the intermediate block 31 outside in the tire width direction and flows in various directions, the air flowing into the lateral groove 15b becomes relatively small. Therefore, in this embodiment, in the intermediate block 31, the notch 19 is formed at the position where the lateral groove 15b and the circumferential groove 12a cross. As shown by an arrow 51 in FIG. 4, the air flowing from the shoulder groove 17 flows through the circumferential groove 12a and the notch 19 into the lateral groove 15b. By forming the notch 19 in this manner, the air flowing from the shoulder groove 17 efficiently flows into the lateral groove 15b. By this air flow, heat radiation of the tread portion is promoted and the tread portion is cooled.

Also, since the inclined portion 20 is formed, as shown by an arrow 50 in FIG. 4, when the heavy load tire 100 rotates, the air easily flows through the lateral groove 14b and the circumferential groove 11a into the lateral groove 15b. Also, since the groove 18 is formed, as shown by an arrow 52 in FIG. 4, when the heavy load tire 100 rotates, the air easily flows into the lateral groove 15b.

As described above, by forming the notch 19, the inclined portions 20, and the grooves 18, when the heavy load tire 100 rotates, the air easily flows into the tread portion (the lateral groove 15b). By this air flow, heat radiation of the tread portion is promoted and the tread portion is cooled.

(Simulation Result)

Figure 5:
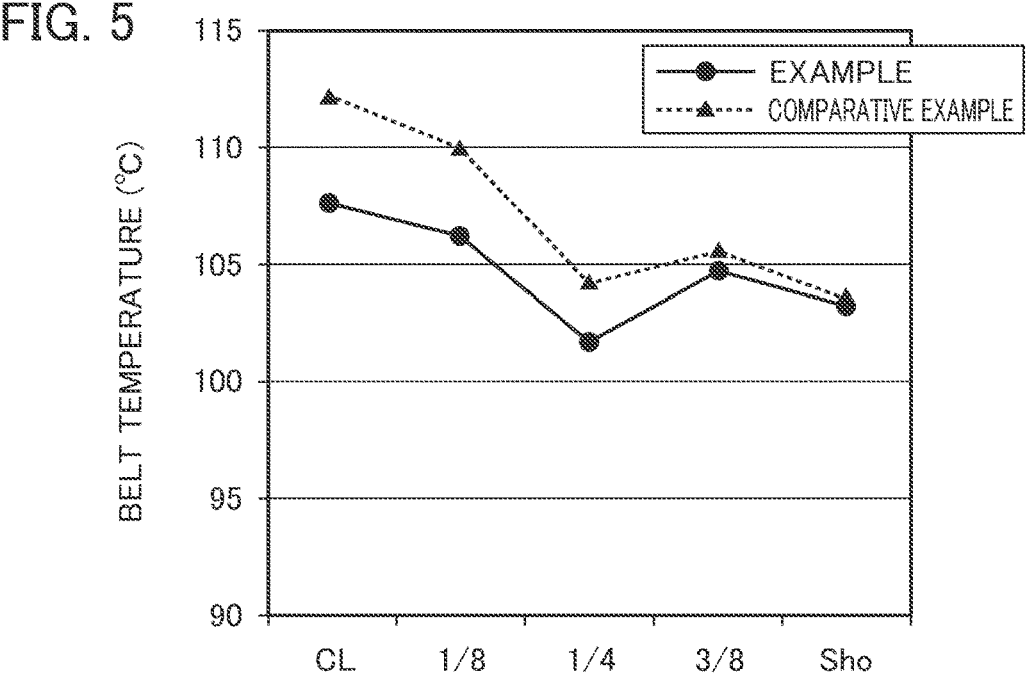
FIG. 5 is a graph showing the relationship between each tire position and belt temperature.

The inventor evaluated the performance of the heavy load tire 100 according to the present embodiment (hereinafter referred to as the example) and the conventional tire without the notch 19, the inclined portion 20, and the groove 18 (hereinafter referred to as the comparative example) by simulation. The simulation was performed using FEM (finite element method). The simulation result is shown in FIG. 5. As shown in FIG. 5, it can be seen that the belt temperature of the example is lower than the belt temperature of the comparative example at each position of the heavy load tire 100. In the horizontal axis of FIG. 5, "CL" shows the tire equator line. When the tread width is W, "⅛" shows a position advanced by 0.125 W from the tire equator line CL toward outside in the tire width direction. "¼" shows a position advanced by 0.25 W from the tire equator line CL toward outside in the tire width direction. "⅜" shows a position advanced by 0.375 W from the tire equator line CL toward outside in the tire width direction. "Sho" shows the tread surface end TE.

Next, with reference to FIG. 6, the inclined portion 20 and the groove 18 will be described.

Figure 6:
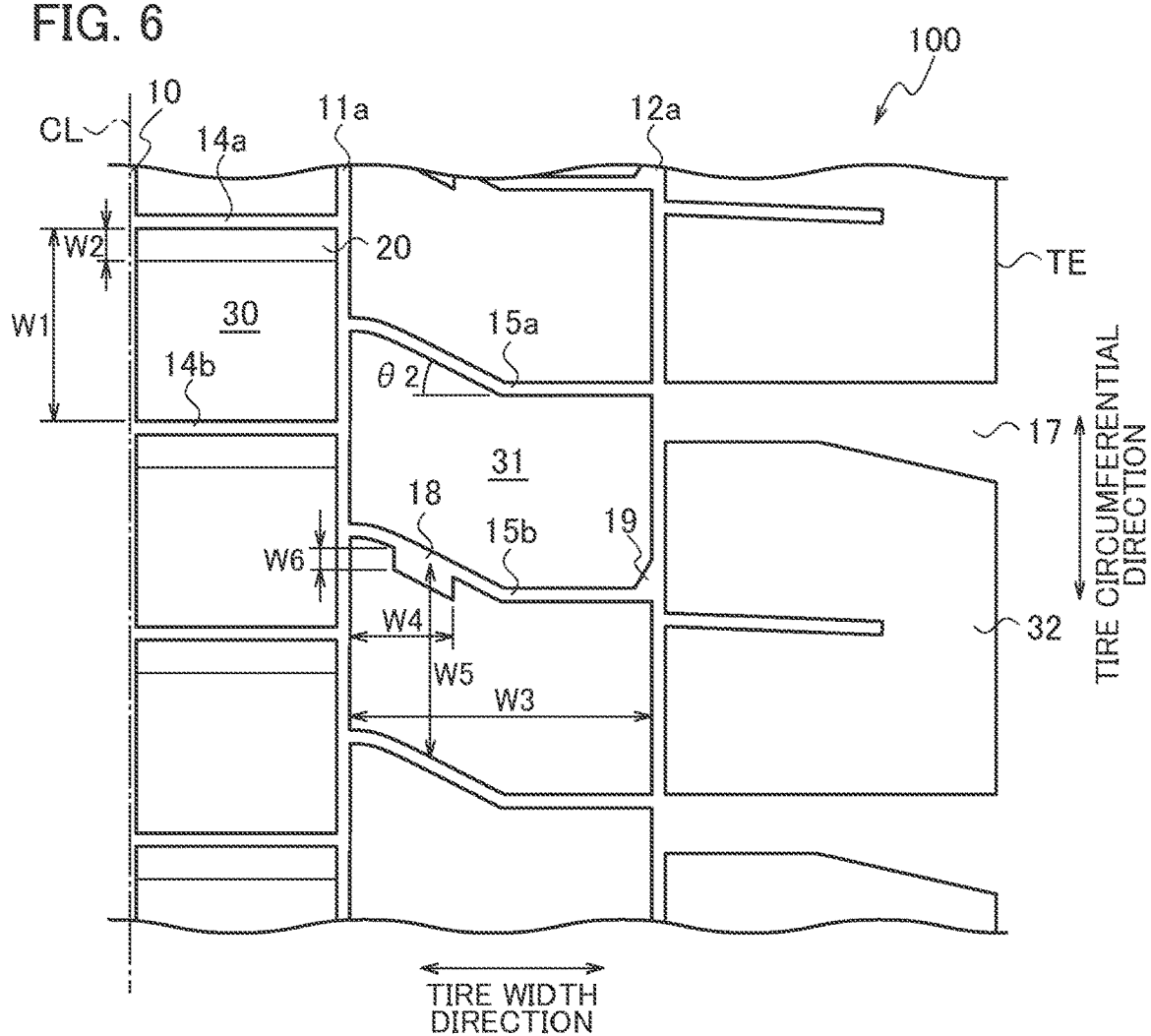
FIG. 6 is a plan view showing the tread surface of the heavy load tire according to an embodiment of the present invention.

As shown in FIG. 6, when a length of the center block 30 along the tire circumferential direction is W1 and a length of the inclined portion 20 along the tire circumferential direction is W2, W2/W1 is in the range of 5% to 30%. W2/W1 may be in the range of 10% to 20%.

As shown in FIG. 6, when a length of the intermediate block 31 along the tire width direction is W3 and a length from the side wall of the intermediate block 31 inside in the tire width direction to the side wall of the groove 18 outside in the tire width direction is W4, W4/W3 is in the range of 10% to 40%.

As shown in FIG. 6, when s length of the intermediate block 31 along the tire circumferential direction is W5 and a length of the groove 18 along the tire circumferential direction is W6, W6/W5 is in the range of 10% to 40%.

As described above, the lateral groove 15a and the lateral groove 15b are inclined in the tire width direction from outside in the tire width direction toward the tire equator line CL with the bending point as a boundary. As shown in FIG. 6, the inclination angle θ2 of the lateral groove 15a and the lateral groove 15b with respect to the tire width direction is 5 to 60 degrees.

Figure 7:
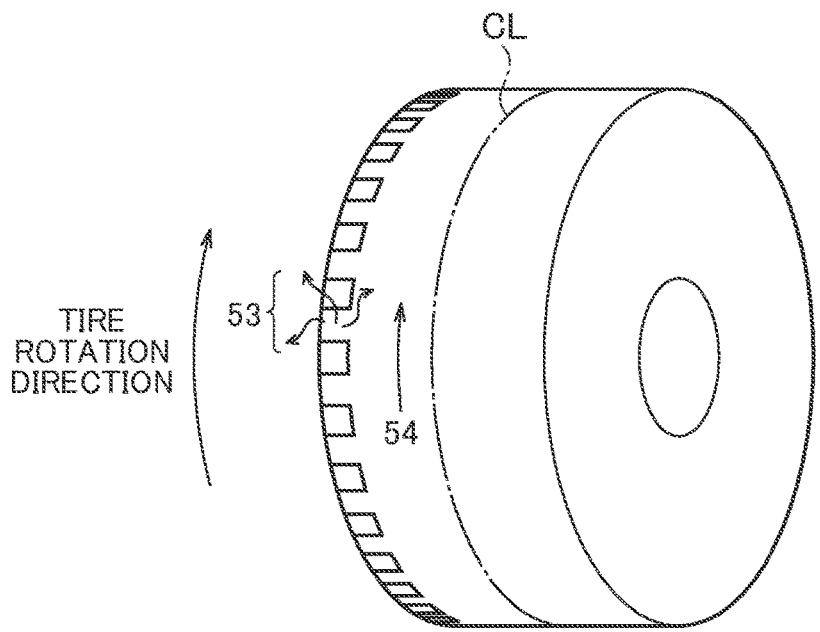
FIG. 7 illustrates air flow.

Next, with reference to FIG. 7, at the stepping end of the intermediate block 31, the reason why the groove 18 is formed inside in the tire width direction will be described. As shown in FIG. 7, around the shoulder block (outside in the tire width direction), it is generally known that the air flow is disturbed as shown by an arrow 53 due to the influence of the shoulder block.

On the other hand, in the vicinity of the tire equator line CL, as shown by an arrow 54, turbulence of the air is less than that in the vicinity of the shoulder block. Therefore, when the groove 18 is formed outside in the tire width direction, the air may hardly flow into the lateral groove 15b. On the other hand, when the groove 18 is formed inside in the tire width direction as in the embodiment, the air easily flows into the lateral groove 15b and cooling of the tread portion is promoted.

(Working and Effects)

As discussed above, the heavy load tire 100 according to the embodiment obtains the following working and effects.

In the embodiment, on the whole surface of one end portion in the tire circumferential direction of the center block 30, the inclined portion 20 inclined inward in the tire radial direction toward the end portion is formed. The inclination angle θ of the inclination portion 20 is less than 20 degrees with respect to the tire circumferential direction. By forming the inclined portion 20, as shown by the arrow in FIG. 2, when the heavy load tire 100 rotates, the air easily flows into the lateral groove 14a and the lateral groove 14b. By this air flow, heat radiation of the tread portion is promoted and the tread portion is cooled.

On the wall surface of the stepping end of the intermediate block 31, the groove 18 is formed inside in the tire width direction. When the length of the intermediate block 31 along the tire width direction is W3 and the length from the side wall of the intermediate block 31 inside in the tire width direction to the side wall of the groove 18 outside in the tire width direction is W4, W4/W3 is in the range of 10% to 40%. By forming the groove 18, as shown by the arrow 52 in FIG. 4, when the heavy load tire 100 rotates, the air easily flows into the lateral groove 15b. By this air flow, heat radiation of the tread portion is promoted and the tread portion is cooled.

One end of the lateral groove 15a (the lateral groove 15b) communicates with the circumferential groove 11a, but does not communicate with the lateral groove 14a (the lateral groove 14b). When the lateral grooves 15a (the lateral groove 15b) communicates with the lateral groove 14a (the lateral groove 14b), there is a possibility that the air flow is disturbed at the intersection, and that the air hardly flows into each groove. Therefore, in the embodiment, the lateral groove 15a (the lateral groove 15b) does not communicates with the lateral groove 14a (the lateral groove 14b). By this, the air easily flows into each groove, and the tread portion is efficiently cooled.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

Figure 8:
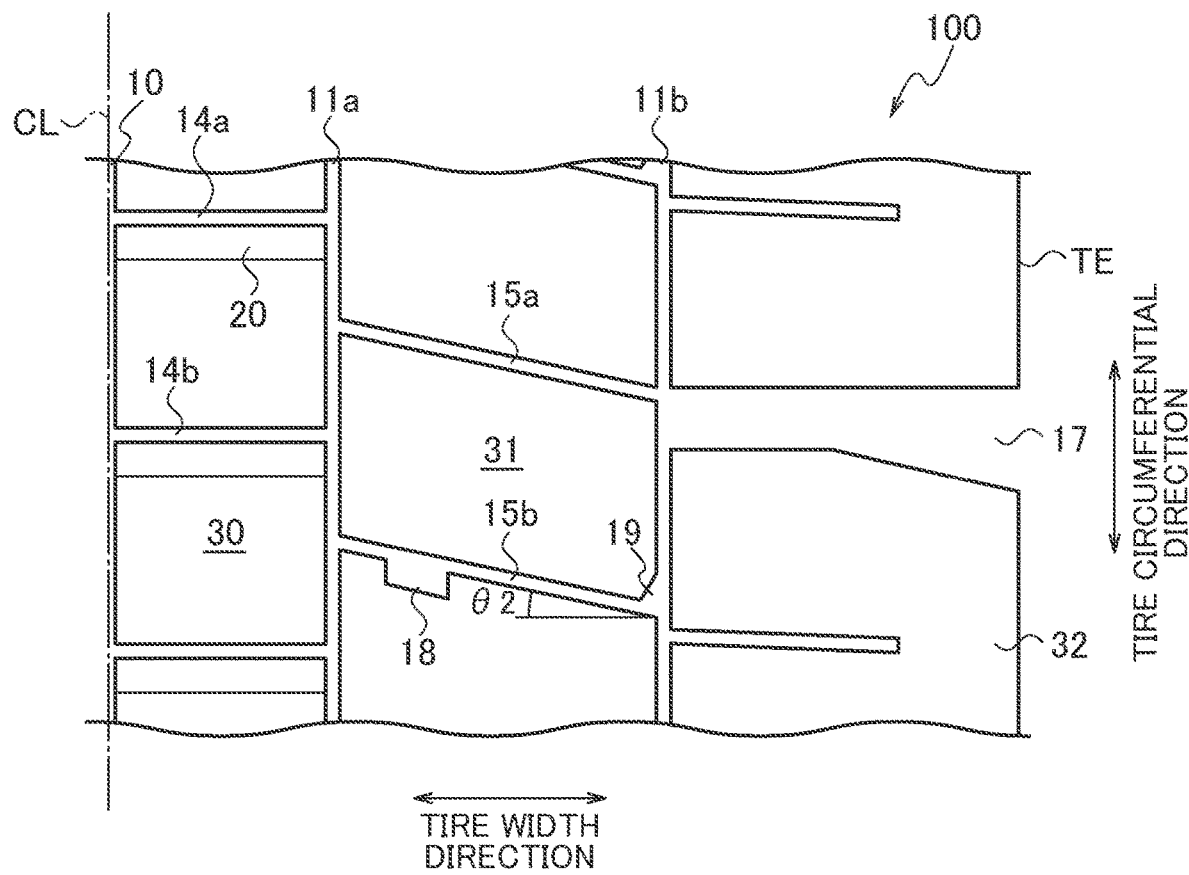
FIG. 8 is a plan view showing the tread surface of the heavy load tire according to an embodiment of the present invention.

For example, it has been described that the lateral groove 15a and the lateral groove 15b have the bending point, the present invention is not limited thereto. As shown in FIG. 8, the lateral groove 15a and the lateral groove 15b can have a linear shape. The inclination angle θ2 shown in FIG. 8 is the same as the inclination angle θ2 shown in FIG. 6.

A groove depth of the shoulder groove 17 is deeper than a groove depths of the circumferential groove 11a, the circumferential groove 12a, the lateral groove 15a, and the lateral groove 15b. The groove depths of the circumferential groove 11a, the circumferential groove 12a, the lateral groove 15a, and the lateral groove 15b can be the same or different, respectively. For example, the groove depth of the circumferential groove 11a can be deeper than the groove depths of the circumferential groove 12a, the lateral groove 15a, and the lateral groove 15b. Such the groove depth provides the same effect as that described above.

The groove widths of the circumferential groove 10, the circumferential groove 11a, the circumferential groove 11b, the circumferential groove 12a, and the circumferential groove 12b are not particularly limited. For example, the groove widths of the circumferential groove 10, the circumferential groove 11a, the circumferential groove 11b, the circumferential groove 12a, and the circumferential groove 12b are 3 mm to 30 mm.

A fin can be provided in a buttress portion of the heavy load tire 100 (not shown).

This application is based upon and claims the benefit of priority from Japanese Patent Application No. 2018-115869, filed on Jun. 19, 2018, the entire contents of which are incorporated herein by reference.

REFERENCE SIGNS LIST

100 heavy load tire
10, 11a, 11b, 12a, 12b circumferential groove
14a, 14b, 15a, 15b lateral groove
17 shoulder groove
18 groove
20 inclined portion
30 center block
31 intermediate block
32 shoulder block

The invention claimed is:

1. A heavy load tire comprising:
a plurality of circumferential grooves extending along a tire circumferential direction;
a plurality of lateral grooves extending in a tire width direction and formed in a direction crossing the circumferential grooves;
a plurality of blocks partitioned by the circumferential grooves and the lateral grooves, wherein on a whole surface of one end portion in the tire circumferential direction of a center block formed in a center area among the plurality of blocks, an inclined portion inclined inward in a tire radial direction toward the end portion is formed; and
a shoulder groove that opens at an outermost position of a tread surface in the tire width direction and extends along the tire width direction, wherein:
the plurality of circumferential grooves include a first circumferential groove extending along the tire circumferential direction on a tire equator line, two second circumferential grooves adjacent to the first circumferential groove, and two third circumferential grooves formed outside the second circumferential grooves in the tire width direction,
the plurality of lateral grooves include a first lateral groove communicates with the second circumferential groove and the third circumferential groove and communicates with the shoulder groove, and a second lateral groove communicates with the second circumferential groove and the third circumferential groove and does not communicate with the shoulder groove,
the plurality of blocks include an intermediate block partitioned by the second circumferential groove, the third circumferential groove, the first lateral groove, and the second lateral groove, and
on a wall surface of a stepped end of the intermediate block, a groove is formed inside in the tire width direction toward the tire radial direction.

2. The heavy load tire according to claim 1, wherein when a length of the intermediate block along the tire width direction is W3 and a length from a side wall of the intermediate block inside in the tire width direction to a side wall of the groove outside in the tire width direction is W4, W4/W3 is in the range of 10% to 40%.

3. The heavy load tire according to claim 1, wherein the plurality of lateral grooves include a third lateral groove communicates with the first circumferential groove and the second circumferential groove,
the third lateral groove and the second lateral groove do not communicate with each other.

* * * * *